W. L. McDONALD.
DIFFERENTIAL GEARING.
APPLICATION FILED FEB. 17, 1913.
1,111,849.
Patented Sept. 29, 1914.
3 SHEETS—SHEET 3.
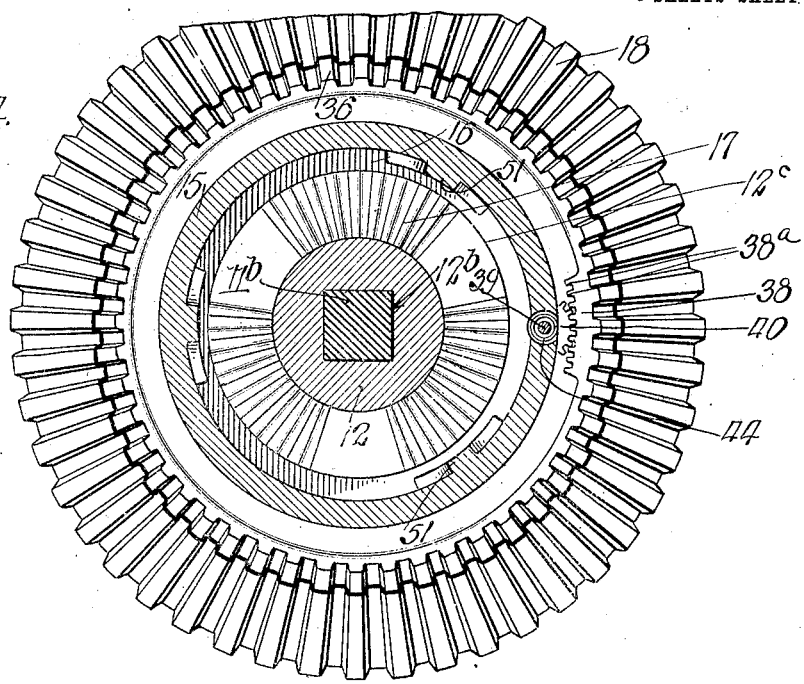
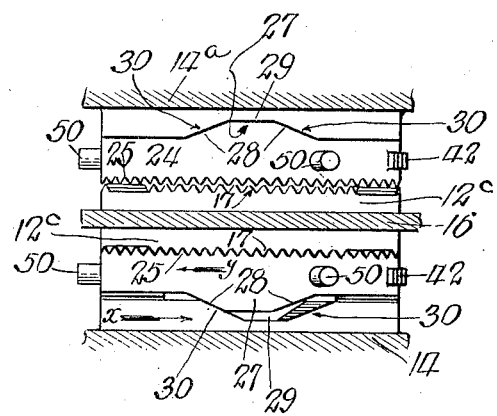
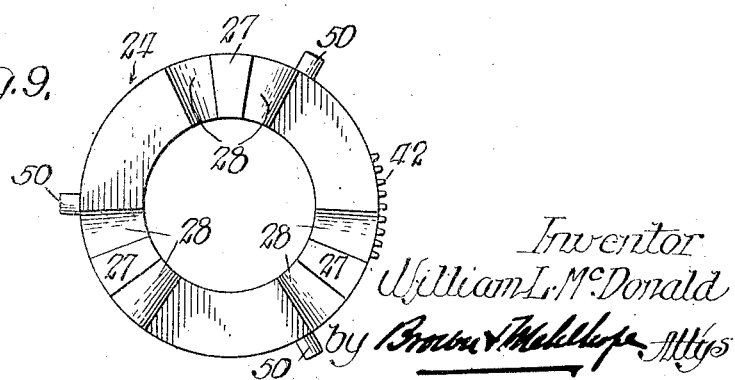

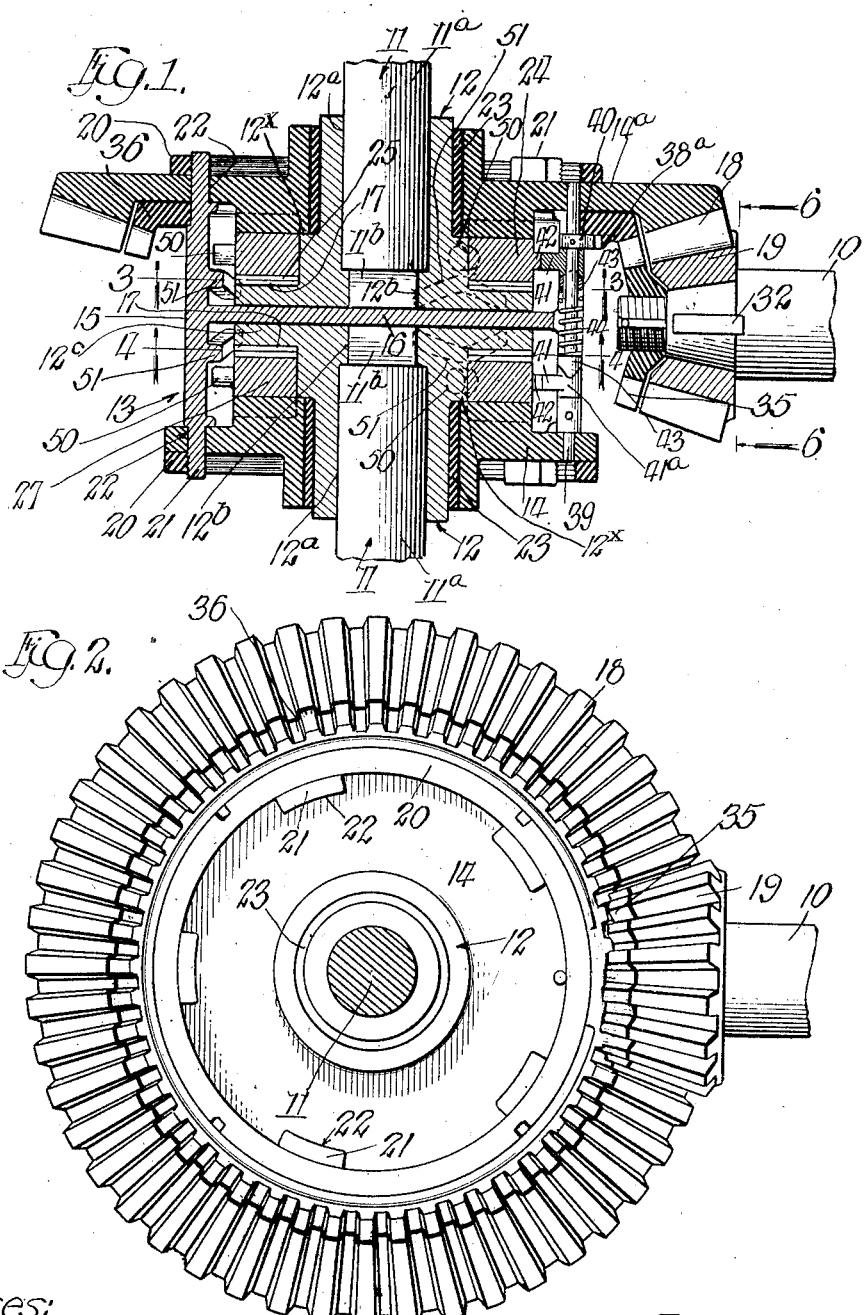

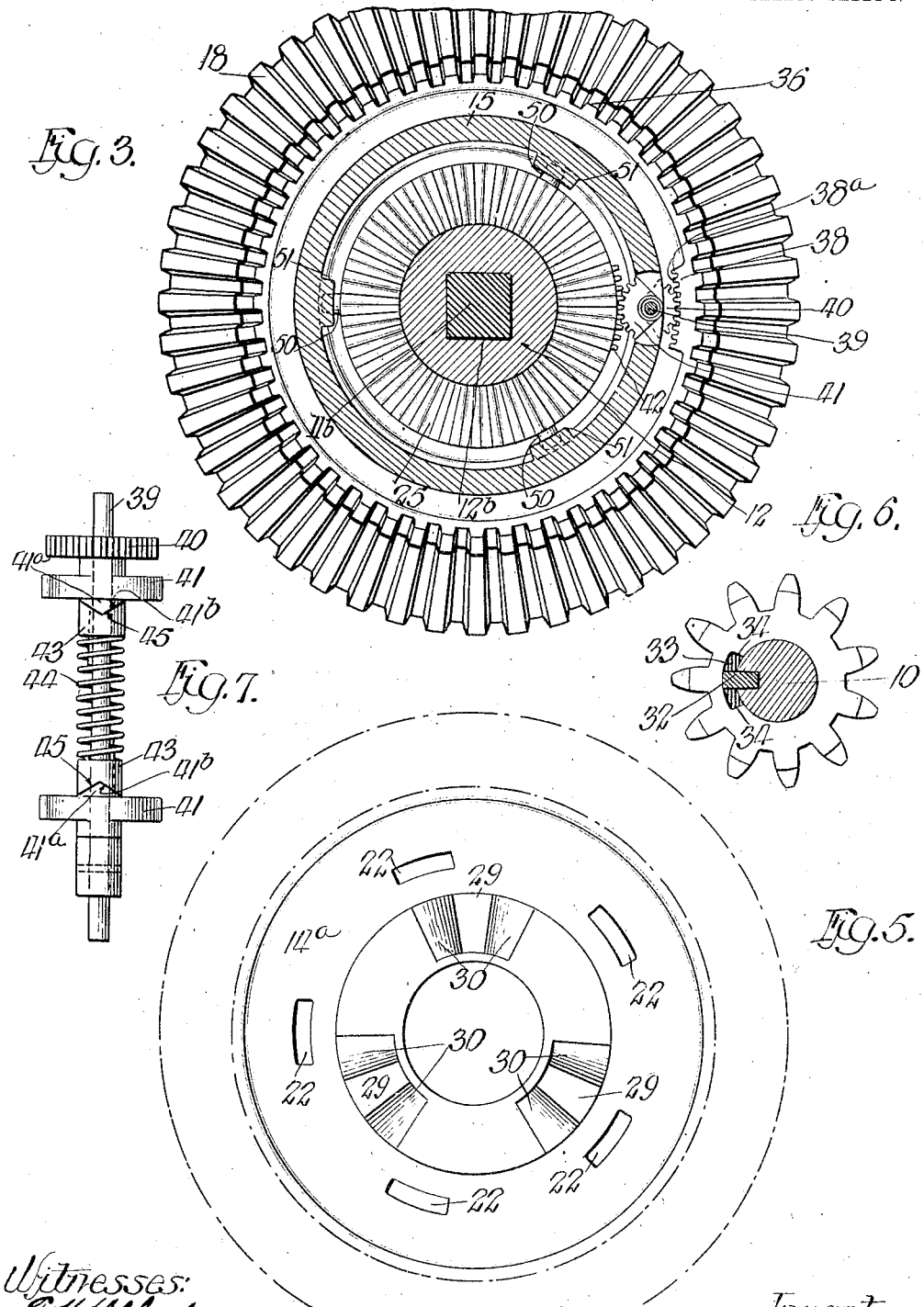

UNITED STATES PATENT OFFICE.

WILLIAM L. McDONALD, OF CHICAGO, ILLINOIS.

DIFFERENTIAL GEARING.

1,111,849.  Specification of Letters Patent.  Patented Sept. 29, 1914.

Application filed February 17, 1913. Serial No. 748,796.

*To all whom it may concern:*

Be it known that I, WILLIAM L. McDONALD, a citizen of the United States, and a resident of Chicago, in the county of Cook and State of Illinois, have invented certain new and useful Improvements in Differential Gearing; and I do hereby declare that the following is a full, clear, and exact description thereof, reference being had to the accompanying drawings, and to the letters of reference marked thereon, which form a part of this specification.

This invention relates to improvements in differential gearing, more particularly intended for application in motor driven vehicles, and consists of the matters hereinafter described and more particularly pointed out in the appended claims.

In the more familiar type of differential gearing heretofore in use, if one of the two traction wheels driven by the differential gearing loses its grip and slips or slides and speeds ahead of the other, the tendency is for all or substantially all of the driving force of the driving shaft to be imparted to the said wheel. Said force is thus lost or dissipated in the increased speed of the said wheel, which "races" without effect, while the other wheel, which has a traction grip, receives practically no driving force and stands still. Thus a traction grip by both wheels driven by such differential gearing is essential in order that the vehicle carried by them may be driven.

The object of this invention is to provide a differential gearing in which either of the traction wheels driven by the gearing will be automatically disconnected from driving connection with the gearing the instant that it starts to rotate more rapidly than the associated traction wheel, as in turning a corner, remaining thus as long as its higher speed of rotation continues, but will be automatically returned to its operative connection with the gearing when its speed falls to that of its companion wheel. And, if for any reason one wheel loses or tends to lose its traction grip, it will only receive driving force in proportion to the resistance offered by it, while the balance of the driving force of the differential gearing will be imparted to the other wheel, that is to say, the one retaining its traction grip. Thus the "racing" that may occur in the case of the ordinary differential gearing is prevented.

In the drawings:—Figure 1 is a view representing a longitudinal central section through the improved differential gearing in a plane containing the longitudinal central axis of the main drive-shaft, and the common axis of the two driven shafts. Fig. 2 is a side elevation of the differential gearing. Fig. 3 is a view representing a section through the gearing in a plane indicated by the line 3—3 of Fig. 1. Fig. 4 is a similar section in a plane indicated by the line 4—4 of Fig. 1. Fig. 5 is a view representing an elevation of the inner face of one of the end walls of the casing inclosing the gearing. Fig. 6 is a view representing a section through the drive-shaft in a plane indicated by the line 6—6 of Fig. 1. Fig. 7 is a detail plan view of a rock-shaft to be referred to more particularly later. Fig. 8 is a diagrammatic view showing the position of some of the parts of the mechanism when one shaft speeds ahead of the other. Fig. 9 is a detail view in side elevation of one of the cam rings used in the connection.

Referring now to that embodiment of my invention illustrated in the drawings, 10 indicates the main drive-shaft and 11, 11 the two driven-shafts or parts comprising a two-part driven shaft, each being connected to one of the traction wheels of the automobile or other type of vehicle that is being driven in any usual manner. Each shaft is fixed in a flanged sleeve 12, having rotative bearing in a rotative casing, indicated as a whole by the numeral 13, which is driven from the main drive-shaft 10 and which incloses the clutch members and the devices for operating them by means of which said casing is operatively connected with the two driven shafts. As shown, the sleeve 12 has a cylindric bore 12ª throughout part of its length in which a cylindric part 11ª of the shaft 11 is mounted and a bore 12ᵇ, square in section, at its inner end, into which extends the squared end 11ᵇ of said shaft.

The rotative casing 13 in which the sleeves 12 have bearing, comprises spaced disks 14, 14ª, which form the end walls of the casing and a cylindric sleeve 15 which forms the intermediate side wall of the casing. Said sleeve is provided with a diametric partition or dividing wall 16, which separates the casing into two chambers in which are located the respective clutch members associated with the two driven shafts.

The parts of the casing 13 are rigidly, but detachably, connected together and preferably in such manner that either end wall may be removed so as to get at the parts inclosed in the proximate chamber without disturbing the other end of the casing. As shown, the sleeve 15 has at its ends a number of annularly spaced, longitudinally extending, tongues 21 which engage in suitable slots 22 formed in the end wall disks in such manner as to non-rotatively connect the disks with the sleeve. The tongues 21 project beyond the outer faces of the disks and are threaded to receive a threaded ring 20 which acts as a nut to draw the associated end wall disk of the casing against the end of the sleeve and thus rigidly secure it in place.

18 indicates a bevel-gear which is made rigid with the casing 13 and which is engaged by a beveled-pinion 19 mounted on the drive-shaft 10. As shown, the beveled gear 18 is made integral with one of the end wall disks of the casing, namely, the end wall 14ª (see Fig. 1). Said end wall is made larger in diameter than the cylindric wall of the casing and the gear-teeth are placed on the inner face thereof so that they form a ring surrounding the casing and having its center coinciding with the longitudinal central axis thereof.

As before stated the sleeves 12 have rotative bearing in the casing 13, 23 indicating bushings secured in the end walls of the casing to provide such bearing. The inner ends of the sleeves abut against the opposite faces of the dividing wall 16 of the casing. 12ˣ indicates a radially extending shoulder on each sleeve which abuts against the end wall of the casing and locks the sleeve against endwise withdrawal from the casing. 12ᶜ indicates a radially extending flange at the inner end of the sleeve, the same constituting a clutch member and having on its outer face clutch-teeth 17 which are in the form of radially extending ribs arranged in annularly spaced groups as shown in Fig. 4. Between the flange 12ᶜ and the proximate end wall of the casing there is located a ring 24 which is rotatively mounted on the associated sleeve 12 and is capable of lateral sliding movement on said sleeve. Said ring constitutes a second clutch-member adapted to coöperate with the flange 12ᶜ and has on its face next said flange, radially extending clutch-teeth or ribs 25. On the opposite face of the said ring 24 next to the end wall of the casing there are provided laterally extending cam lugs or projections 27 which are disposed radially on the face of the ring and have circumferentially spaced, oppositely inclined faces 28, 28 (see Fig. 8). On the inner face of the end wall of the casing are provided a like number of similarly spaced and disposed cam grooves 29 into which said lugs extend and with which they are adapted to co-act and which have inclined surfaces 30, 30 (see Fig. 8) which are circumferentially spaced apart, the same distance, and have the same inclination as the inclined faces 28 of the cam lugs 27. The construction is such that when the laterally movable ring 24 is positioned on its associated sleeve 12 as close to the end wall of the casing as it may be, each inclined surface 28 of the several cam lugs engages the associated inclined surface 30, of its cam groove (as shown on the upper part of Fig. 8) and the clutch teeth 25 on the other face of the ring are separated from the clutch teeth 17 on the flange of the disk 12. A rotative movement of the ring relative to the end wall of the casing in either direction will by reason of the co-action of the one associated pair of inclined surfaces of the cams and grooves or the other pair cause a lateral movement of the ring 24 to bring its clutch teeth 25 into positive engagement with the clutch-teeth 17 on the flange of the sleeve 12 so as to lock the said ring to the sleeve as shown in the lower part of Fig. 8. As the cam lugs 27 still extend into and are engaged in the cam grooves 29, it is apparent that this lateral movement of the rings 24 will lock the sleeve 12 and its associated shaft 29 to the casing. Thus when the ring 24 is in the position shown in the upper part of Fig. 8, the shaft 11 is capable of rotative movement independently of the casing, while the other shaft 11 is locked to the casing and incapable of independent rotative movement relative thereto, when the ring is in the position shown in the lower part of Fig. 8.

The driving pinion 19 is so mounted that it is capable of a certain amount of free play on the drive-shaft 10. As shown, in Fig. 6, the key 32, which connects said pinion with the shaft 10, engages in an annularly elongated groove 33. It is apparent that the shaft 10 will not act to rotate the pinion until the key 32 is brought to engage with one of the shoulders 34 at the ends of said groove. The shaft 10 is projected beyond the pinion 19 and has there non-rotatively fixed to it a small pinion 35, having teeth as shown herein which correspond in number and are similar in shape to the teeth of the pinion 19. Said auxiliary pinion engages a large beveled gear 36 which is rotatively mounted on the cylindric wall 15 of the casing 13 in a plane adjacent to the end wall 14ª of said casing, with its teeth corresponding in number and similar in shape to the teeth of the beveled gear 18. The construction is such that the gears 18 and 36 will be rotated in unison after the initial loose movement of the gear 36 relative to the gear 18.

At one part of its face the gear 36 has a short annular rib or flange 38 on the inner edge of which are formed inwardly extending gear teeth 38ª. Said teeth are separated by an annular space from the cylindric shell 15 of the casing. 39 indicates a rock-shaft rotatively mounted in the casing 13 closely adjacent to said gear teeth. Said rock-shaft 39 extends parallel to the longitudinal axis of the casing and has bearing at its ends in the end walls 14, 14ª of said casing. The shell of said casing is cut away, as shown in Fig. 4, to provide a space for said shaft. On said rock shaft 39 is fixed a segmental pinion 40 which engages the teeth 38ª.

41, 41 indicates segmental gears loosely mounted on the shaft 39 and engaging with external gear-teeth 42 on the peripheral edges of the laterally movable rings 24 heretofore referred to. The segmental gears 41 each have a hub 41ª in one end of which there are formed V-shaped cam-lugs 41ᵇ, the cam lugs of the two gears being placed opposed to each other. 43, 43 indicate collars feathered on the shaft 39 and located adjacent to the said hubs of the gears 41. Between them is interposed an expansion coiled spring 44 which acts to hold said collars in engagement with the hubs of the gears 41, 41. Each collar has V-shaped cam grooves 45 which are engaged by the V-shaped cam lugs of the proximate gear hub. From this construction it is apparent that any rotation imparted to the shaft 39 in either direction will be communicated to the collars 43, 43 and will by them be communicated to the gears 41, 41, but owing to the yielding engagement between said collars and the hubs of the gears 41, either gear is capable of independent rotative movement on the shaft in either direction without affecting the other. At the same time, by reason of the cam-lugs and grooves on the said hubs and collars, as soon as the force or impetus which produces such independent movement ceases, the gear affected will be returned to its normal position relative to the fixed pinion 40.

The operation of my improved differential gearing is as follows: When the shaft 10 starts to rotate, the fixed pinion 35 thereof imparts a small rotative movement to the gear 36 in advance of the rotative movement imparted by the main driving pinion 19 of the gearing, by reason of the fact that said driving pinion 19 is capable of a slight play on said shaft. This initial advance movement of the gear 36 acts through the inwardly extending gear-teeth 38ª of the pinion 40 to rock the shaft 39 and through the segmental gears 41, 41, to give a slight rotative movement to the rings 24, 24, forming part of the clutch mechanism. As will be apparent this rotative movement imparted to the rings is in a direction the reverse of that in which the gear 36 and also the gear 18 is rotated, so that if the driving-shaft acts to rotate the gear 18 and with it the casing in the direction of the arrow $x$ in the diagrammatic view shown in Fig. 8, the relative rotative movement imparted to the rings 24 will be in the direction of the arrow $y$ shown in the lower part of said view. It will be understood that both rings will be caused to act in the same way and will thus be moved from the inoperative position shown in the upper part of Fig. 8 to the operative position shown in the lower part of Fig. 8. As heretofore pointed out this produces a locking engagement between the rings 24 and their associated flanged sleeves 12, thus coupling the shafts 11 to the casing so that said shafts both rotate with said casing. If either of the shafts 11 begins to rotate more rapidly than the other shaft, the ring 24 associated with said shaft will be caused to creep ahead of the casing thus rotating relatively to the casing and to the other ring, notwithstanding the yielding connection between said rings which tends to prevent said relative rotation. Since any tendency of such creeping ahead relieves the pressure of the inclined surfaces 30 of the cam groove 29 against the inclined surfaces 28 of the cam-lugs 27 of said ring, the ring will slide laterally so as to release its clutch teeth from those of the associated flanged sleeve 12, and the shaft will then rotate independently and all the rotative power of the casing will be communicated to the other shaft. As soon as the said shaft slows down to the speed of the casing, said ring is caused by its spring connection with the other ring and the action of the cam surfaces to move laterally into position where it operates as a clutch to again couple the shaft to the casing. It is apparent that the same result will be produced if the drive-shaft is rotated in the opposite direction, and that in all cases where either shaft tends to rotate faster than the other when driven in either direction, it will be temporarily uncoupled from its driving connection with the casing and all of the rotative force will be imparted to the other shaft.

In order to insure the operation of the rings 24 as described and to prevent their clutch teeth from sticking to the clutch-teeth of the associated flanged sleeve when they would otherwise separate, as when the clutch-teeth have been caked with heavy or gummy oil, I prefer to provide one or more radially extending pins 50 on the periphery of each ring and provide on the inner surface of the shell of the casing, V-shaped ribs 51 which are adapted to be struck by said pins when the rings are rotated in either direction and forcibly impart to said rings the lateral movement required to disengage them from their clutch-teeth.

While in describing my invention I have referred to certain details of mechanical construction and arrangement it is to be understood that the invention is in no way limited thereto except as may be pointed out in the appended claims.

I claim as my invention:—

1. A differential gearing comprising the combination of a drive-shaft, a two-part driven shaft, a rotatable casing in which the two parts of said driven shaft have bearing, a clutch device for each shaft part comprising a clutch member fixed to the associated shaft part and a rotative ring movable endwise thereof, said ring having cam lugs adapted to interlock with said casing but permitting a limited rotative movement of said ring in either direction with reference to said casing by means of which said ring is forced into engagement with its associated clutch member, means connecting said two rings for rotating them in unison independently of said casing, said means providing for yielding relative rotative movement between said two rings, mechanism for driving said casing in either direction, and means intermediate said drive mechanism and said rings acting to impart limited rotative movement to them relative to the casing in advance of the rotative movement of the casing, and in the opposite direction.

2. A differential gearing comprising the combination of a drive-shaft, a two-part driven shaft, a casing in which the two parts of said driven shaft have bearing, a clutch device for each part of said driven shaft, comprising a clutch member fixed to the associated shaft part and a rotative ring movable endwise thereof, said ring having cam lugs adapted to interlock with said casing but permitting a limited rotative movement of said ring in either direction with reference to said casing by means of which said ring is forced into engagement with its associated clutch member, a beveled gear fixed to said casing, a driving pinion meshing therewith and capable of limited rotative movement on said drive shaft, means connecting said two rings for rotating them in unison independently of said casing, said means providing for yielding relative rotation between said two rings, and means intermediate said drive shaft and said rings acting to impart limited rotative movement to them relative to the casing in advance of the rotative movement of the casing and in the opposite direction.

3. A differential gearing comprising the combination of a drive-shaft, a two-part driven shaft, a casing in which the two parts of said driven shaft have bearing, said casing having end walls provided with cam grooves, a clutch device for each part of said driven shaft, comprising a clutch member fixed to the associated shaft part and a rotative ring movable endwise thereof, said ring having cam lugs coacting with the cam grooves in said casing end walls and adapted to interlock therewith but permitting a limited rotative movement of said ring in either direction with reference to said casing by means of which said ring is forced into engagement with its associated clutch member, a beveled gear fixed to said casing, a driving pinion meshing therewith and capable of limited rotative movement on said drive shaft, means connecting said two rings for rotating them in unison independently of said casing, said means providing for yielding relative rotation between said two rings, a member rotative on said casing, means fixed to said drive shaft operatively engaging said rotative member, and means operatively connecting said rotative member and said ring rotating means.

4. A differential gearing comprising the combination of a drive-shaft, a two-part driven shaft, a casing in which the two parts of said driven shaft have bearing, a clutch device for each part of said driven shaft, comprising a clutch member fixed to the associated shaft part and a rotative ring movable endwise thereof, said ring having cam lugs adapted to interlock with said casing but permitting a limited rotative movement of said ring in either direction with reference to said casing by means of which said ring is forced into engagement with its associated clutch member, a beveled gear fixed to said casing, a driving pinion meshing therewith and capable of limited rotative movement on said drive shaft, a rock shaft carried by said casing, means interposed between said rock shaft and said rings for imparting limited rotative movement to said rings, said means including a resilient member acting to permit yielding relative rotative movement between said rings, and means intermediate said drive shaft and said rock shaft acting to impart limited rotative movement to the rock shaft in advance of the rotative movement of the casing.

5. A differential gearing comprising the combination of a drive-shaft, a two-part driven shaft, a casing in which the two parts of said driven shaft have bearing, a clutch device for each part of said driven shaft, comprising a clutch member fixed to the associated shaft part and a rotative ring movable endwise thereof, said rings having cam lugs adapted to interlock with said casing but permitting a limited rotative movement of said ring in either direction with reference to said casing by means of which said ring is forced into engagement with its associated clutch member, a beveled gear fixed to said casing, a driving pinion meshing therewith and capable of limited rotative movement on said drive shaft, a rock shaft carried by said casing, gears on said rock shaft rotatively engaged with said rings, means connecting said last-named gears with said rock shaft for imparting rotative movement from said rock shaft to said rings but providing for yielding relative rotative movement between said rings, and means intermediate said drive shaft and said rock shaft acting to impart relative rotative movement to the rock shaft in advance of the rotative movement of the casing.

6. A differential gearing comprising the combination of a drive-shaft, a driving pinion on said drive shaft capable of limited rotative movement thereon, a two-part driven shaft, a casing in which the two parts of said driven shaft have bearing, said casing comprising a cylindric shell and end walls, a clutch device for each part of said driven shaft, comprising a clutch member fixed to the associated shaft part and a rotative ring movable endwise thereof, said ring having cam lugs adapted to interlock with corresponding cam grooves in the end walls of the casing, said cams and grooves acting to force said rings into engagement with their associated clutch members when said rings are rotated in either direction with reference to said casing, a beveled gear fixed to said casing and intermeshing with said driving pinion, a second beveled gear rotatively mounted on said driving casing, a second pinion fixed to the drive shaft and meshing with said second beveled gear, a rock shaft carried by said casing, means interposed between said rock shaft and said rings for imparting limited rotative movement to said rings including a resilient member acting to permit relative rotative movement between said rings, and operative means intermediate said second beveled gear and said rock shaft.

In testimony, that I, claim the foregoing as my invention I affix my signature in the presence of two witnesses, this 11th day of February A. D. 1913.

WILLIAM L. McDONALD.

Witnesses:
P. H. ALFREDS,
K. W. DALL.